June 14, 1927.
L. CAMPBELL, JR
1,632,055
REGULATOR
Filed Nov. 16, 1925
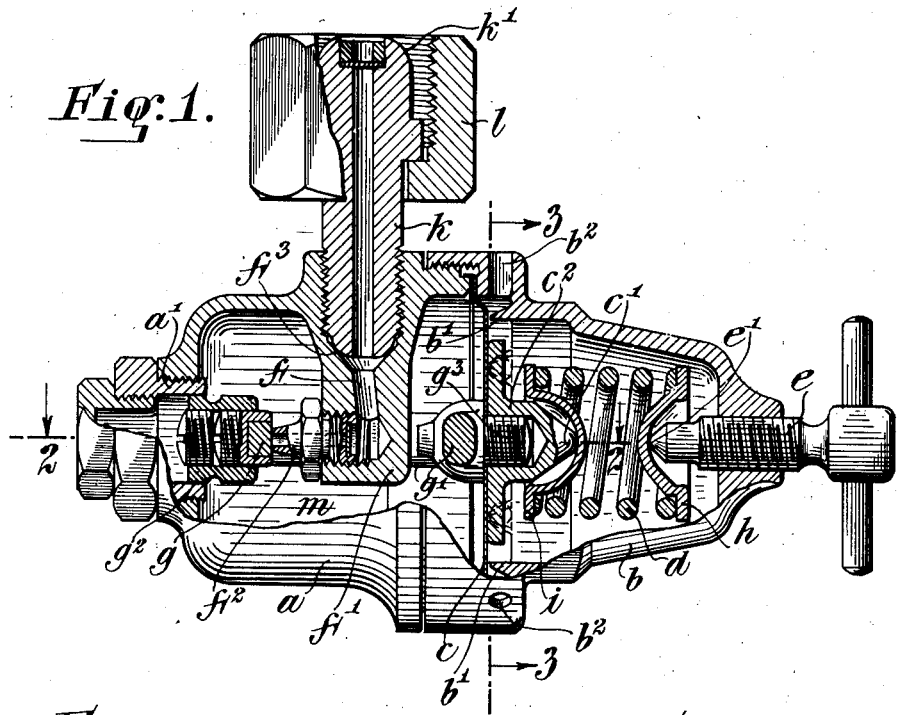
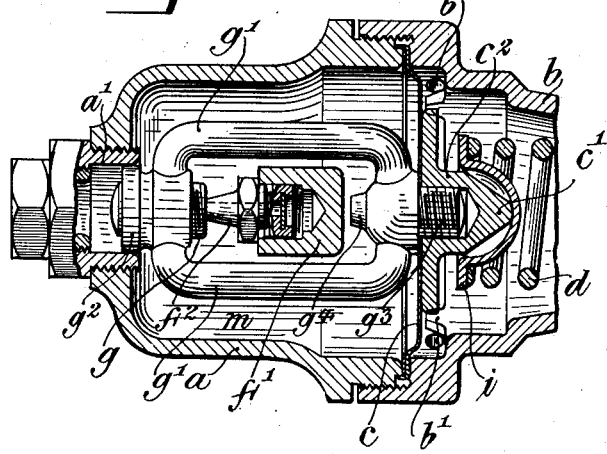
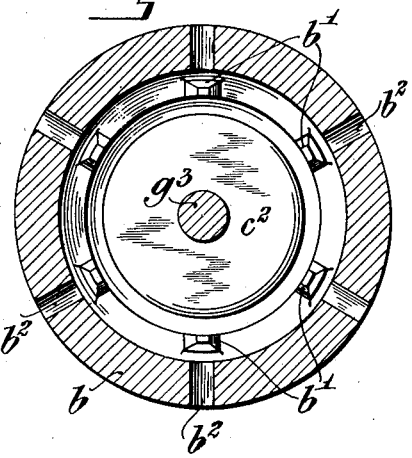
INVENTOR
Lorn Campbell Jr.
BY
Redding, Greeley, O'Shea & Campbell
ATTORNEYS Patented June 14, 1927.

1,632,055

UNITED STATES PATENT OFFICE.

LORN CAMPBELL, JR., OF MINNEAPOLIS, MINNESOTA, ASSIGNOR, BY MESNE ASSIGNMENTS, TO THE HARRIS CALORIFIC COMPANY, OF CLEVELAND, OHIO, A CORPORATION OF OHIO.

REGULATOR.

Application filed November 16, 1925. Serial No. 69,302.

This invention relates to fluid pressure regulating valves, sometimes termed pressure reducing valves, of the character adaptable especially for use in the regulation of higher gas pressures such as may be encountered, for instance, in oxyacetylene welding.

The invention has for its general objects to improve such devices in respect of sensitiveness of control, efficiency and safety in action and adaptability for connection to gas lines.

While it will appear hereinafter that some of the improvements are applicable to regulators of different types, the invention is concerned primarily with that type in which a spring-pressed diaphragm, under the influence of gas pressure controls the inlet. In known regulators of this type one inherent disadvantage, affecting the sensitiveness of operation has been the imposition of a lateral component of force on the controlled element which tends to arrest its free movement and make its action jerky. One of the principal objects of the present invention, specifically, is to apply the spring pressure to the controlled element along a line coincident with its axis of movement so that the controlled element is free from all other forces which might tend to cock it and check its movement. In accordance with this object of the invention the actuating spring is connected operatively to the diaphragm through means which afford capacity for universal movement therebetween and which insure the application of the spring pressure on the axis of movement of the controlled element. The result achieved is supplemented by providing a similar connection between the actuating spring and the means for adjusting its tension so that the spring floats between the last named means and the diaphragm and has full capacity for self-alignment when moving in either direction.

A second object of the invention, specifically, is to incorporate within the device certain safety features by which the diaphragm is protected against undue extension and is safely sheared in case of rupture. The limit stop provided for the diaphragm is carried directly thereby and is itself disposed on the axis of movement of the controlled element and advantage is taken of the internal structure of the gas chamber to provide an abutment for the stop. Similarly, the shearing points are self-embodied within the bonnet and are so disposed with relation to the diaphragm and the vent holes as to be most effective in shearing the diaphragm in case of emergency.

Still another object of the invention is to provide simple mechanical means for connecting a regulator with a source of gas supply, such connecting means serving to form under all conditions a gas tight joint without soldering and serving, in addition, as an adapter enabling the operator, by the proper selection of fittings, to readily connect regulators and gas connections of different standards. In accomplishing this object ground seats are provided and so disposed with relation to the regulator and the gas connection as to insure a gas tight fit when the parts are brought together. The connection itself includes a union nut of appropriate size to engage the gas connection.

In order to increase the efficiency of devices of this character means are incorporated within the nozzle to filter the gas, the location of the screen having certain distinct advantages in operation not heretofore realized.

These and other objects of the invention will appear more particularly hereinafter as the description proceeds in connection with the embodiment illustrated in the accompanying drawings, wherein:

Figure 1 is a view partly in section and partly in elevation of the improved regulator showing clearly the relation of parts.

Figure 2 is a fragmentary sectional view taken on the plane indicated by the line 2—2 of Figure 1 and looking in the direction of the arrows.

Figure 3 is a transverse sectional view taken on the plane indicated by the line 3—3 of Figure 1 and looking in the direction of the arrows.

The invention is not to be limited to the conventional design details of gas regulators since the improvements may be embodied, in whole or in part in regulators of other types than that illustrated in the drawings. However, for the purpose of this application and in accordance with the practical results secured in operation it is preferred to set forth a disclosure of a particular type of gas regulator now in general use in oxyacetylene welding. Such a type comprises generally a chamber $a$ having secured thereto a bonnet $b$ between which is located an expansible diaphragm $c$ the movement of which under the influence of the gas pressure within the chamber $a$ is controlled by a spiral spring $d$ mounted back of the diaphragm within the bonnet $b$ and adjusted in tension by the hand screw $e$. An inlet passage $f$ for gas is provided within a centrally disposed boss $f'$ carried on the inner wall of the chamber $a$. A nozzle $f^2$ is shown as screwed into the boss removably, this nozzle being disposed substantially on the longitudinal axis of the chamber $a$ and bonnet $b$. Escape of the gas from the nozzle is controlled by a movable valve seat $g$ carried on a yoke or arm $g'$ which itself is supported on the diaphragm $c$. A guide member $g^2$ is extended in line with the nozzle $f^2$ and fits slidably within a sleeve $a'$ which may be threaded into the end wall of the casing $a$. Movement of the valve $g$ and the guide $g^2$ is substantially along the axis of the regulator. The use of a spiral spring such as $d$ to move the valve seat $g$ has heretofore resulted in the imposition of a lateral component of force on the valve and its guide $g^2$ since spiral springs where seated on flattened ends inevitably set up unbalanced forces. Obviously, unless the entire force of the spring is impressed on the valve $g$ in a line coincident with its line of movement the guide $g^2$ will tend to be cocked and its free movement resisted. In accordance with the present invention the spring $d$ is seated on plates $h$ and $i$ which are formed centrally with concave sections. One of the plates $h$ engages the pointed or rounded end $e'$ of the adjustable spring stop $e$ while the other plate $i$ seats similarly on the pointed or rounded end $c'$ of a stud carried with the diaphragm $c$. Practically point contacts are thus secured for the spring seats $h$, $i$, so that they may swivel freely on their respective abutments and thereby enable the spring to be self-aligning during its movements. The abutments $e'$, $c'$, are substantially on the axis of movement of the valve $g$ which is likewise the axis of the spring $d$. Since the force of the spring is transmitted to the diaphragm and the valve $g$ along a line coincident with the axis of movement of the valve $g$ and the swiveled connection prevents the imposition of any lateral component of force on the valve the improved device insures free sliding movement of the guide $g^2$ and absence of binding. The result is greater sensitiveness of control and uniformity of movement both of which factors determine the rate of gas discharge.

Movement of the diaphragm $c$ to an excessive extent, under the influence of the spring $d$ will shorten its life and possibly result in a permanent set. In the improved regulator a positive limit stop of simple form is provided to check the movement of the diaphragm. The yoke or arm $g'$ which carries the valve $g$ may be conveniently secured to the diaphragm by forming a stud $g^3$ at its end which extends axially through the diaphragm and is threaded to receive a binding nut $c^2$, the end of which may constitute the abutment for the spring plate $i$, as heretofore described. In line with the stud seat $g^3$ there may be formed a boss $g^4$ which extends in the reverse direction and is of such size and relation to the boss $f'$ on the inner wall of the chamber $a$ as to engage this boss and resist the movement of the diaphragm after it has traveled a predetermined extent.

Provision is made as a safety measure for rupturing the entire diaphragm $c$ in case it is punctured under excessive gas pressure or otherwise. It has heretofore been proposed to accomplish some such shearing of the diaphragm but the means employed have not been effective in action. In accordance with the present invention it is proposed to provide a plurality of shearing members $d'$ directly on the inner wall of the bonnet $b$ and opposite the respective vent holes $b^2$ therein. These points $b'$ extend longitudinally of the bonnet and are presented directly to the diaphragm $c$ so that in case of excessive movement by it such as would result in case of puncture or disintegration it will be impinged sharply on the points disposed around the inner wall of the bonnet. The greater the pressure the more certain the action of the points. Their disposition at right angles to the surface of the diaphragm and opposite the vent holes makes them effective instantly.

It is the usual practice under the high pressures now prevailing to seal the gas inlet connection by soldering. This offers a very decided disadvantage in practice since it interferes with disconnection for purposes of replacement or repair. Another condition in the art which has imposed a burden on the operator is the lack of standardization in the fittings for both gas connections and regulator connections. The result has been that regulators with special fittings have been carried in stock for attachment to various types of gas connections. The conditions described are corrected it is believed by the improvements illustrated herein wherein only a short adapter is employed as an intermediate connection between the regulator and the source of gas. This adapter comprises generally a short pipe connection $k$ having a co-operating union nut $l$. The gas inlet opening $f$ is formed with a ground seat $f^3$ and the adapter pipe $k$ has a complementary end which is adapted to be brought into gas tight seating contact therewith when the pipe $k$ is threaded into the regulator. At the other end of the short pipe $k$ a similar spherial surface $k'$ is provided for co-operation with the end of any type of connection (not illustrated) with which the union nut $l$ may be engaged. The joints thus formed are gas tight and conveniently effected. Adapters of the character described may be carried in stock with suitable threading and suitable union nuts to afford ready connection between gas pipes and regulators of varying designs, shapes and sizes.

Screening of the gas to protect the valve seat against foreign particles is accomplished by incorporating a screen $m$ directly within the nozzle $f^2$ so that all such foreign particles are arrested at a point just before they reach the valve seat $g$. Such disposition of a filter has especial advantage when carried in a removable nozzle $f^2$ since it may be readily inspected for cleaning or replacement.

As pointed out hereinbefore changes in detail of design and arrangement of parts may be made without departing from the spirit or scope of the inventive thought in the various improvements specifically described in so far as the matter is covered by the appended claims.

What I claim is:

1. In a pressure reducing valve, in combination with a casing and a bonnet, said bonnet having a plurality of vent holes formed therein, a movable diaphragm mounted therewithin between the casing and the bonnet, and a plurality of shearing points formed integrally on the inner wall of the bonnet and disposed in line with the vent holes and at right angles to the diaphragm and adjacent to and around its perimeter.

2. In a pressure reducing valve, in combination with a casing and a bonnet, said bonnet having a plurality of vent holes formed therein, a movable diaphragm mounted therewithin between the casing and the bonnet, a plurality of shearing points formed integrally on the inner wall of the bonnet and disposed in line with the vent holes and at right angles to the diaphragm and adjacent to and around its perimeter, a removable nozzle member threaded into the inlet of the valve, said nozzle member being formed with a restricted passage for the nozzle, and a filter positioned directly within the nozzle member and immediately adjacent the restricted passage.

This specification signed this 12" day of Nov. A. D. 1925.

LORN CAMPBELL, Jr.